US010213995B2

(12) United States Patent
Luehn

(10) Patent No.: US 10,213,995 B2
(45) Date of Patent: Feb. 26, 2019

(54) MULTILAYERED COMPOSITE MATERIAL AND OBJECTS MADE THEREFROM

(71) Applicant: KAUTEX TEXTRON GMBH & CO., KG, Bonn (DE)

(72) Inventor: Holger Luehn, St. Augustin (DE)

(73) Assignee: KAUTEX TEXTRON GMBH & CO. KG, Bonn (DE)

( * ) Notice: Subject to any disclaimer, the term of this patent is extended or adjusted under 35 U.S.C. 154(b) by 571 days.

(21) Appl. No.: 14/906,120

(22) PCT Filed: Jul. 11, 2014

(86) PCT No.: PCT/EP2014/064907
§ 371 (c)(1),
(2) Date: May 4, 2016

(87) PCT Pub. No.: WO2015/007636
PCT Pub. Date: Jan. 22, 2015

(65) Prior Publication Data
US 2016/0250829 A1 Sep. 1, 2016

(30) Foreign Application Priority Data

Jul. 18, 2013 (DE) .......................... 10 2013 013 163

(51) Int. Cl.
B32B 27/20 (2006.01)
B32B 5/16 (2006.01)
B32B 27/14 (2006.01)
B32B 27/30 (2006.01)
B32B 1/02 (2006.01)
B60K 15/03 (2006.01)
B29C 43/30 (2006.01)
B29C 43/52 (2006.01)
B29C 47/06 (2006.01)
B32B 7/12 (2006.01)
B32B 27/08 (2006.01)
B32B 27/32 (2006.01)
B29K 23/00 (2006.01)
B29L 31/00 (2006.01)

(52) U.S. Cl.
CPC ............ *B32B 27/20* (2013.01); *B29C 43/305* (2013.01); *B29C 43/52* (2013.01); *B29C 47/065* (2013.01); *B32B 1/02* (2013.01); *B32B 5/16* (2013.01); *B32B 7/12* (2013.01); *B32B 27/08* (2013.01); *B32B 27/14* (2013.01); *B32B 27/306* (2013.01); *B32B 27/32* (2013.01); *B60K 15/03177* (2013.01); *B29K 2023/065* (2013.01); *B29K 2023/086* (2013.01); *B29K 2995/0068* (2013.01); *B29L 2031/7172* (2013.01); *B32B 2250/05* (2013.01); *B32B 2250/246* (2013.01); *B32B 2260/025* (2013.01); *B32B 2264/00* (2013.01); *B32B 2307/726* (2013.01); *B32B 2307/7242* (2013.01); *B32B 2307/7265* (2013.01); *B32B 2323/043* (2013.01); *B32B 2439/40* (2013.01); *B60K 2015/03309* (2013.01); *B60K 2015/03493* (2013.01)

(58) Field of Classification Search
CPC ........... B32B 27/20; B32B 5/16; B32B 27/14; B32B 27/306; B32B 1/02; B32B 7/12; B32B 27/08; B32B 27/32; B32B 2260/025; B32B 2307/7265; B32B 2323/043; B32B 2250/05; B32B 2250/246; B32B 2264/00; B32B 2307/7242; B32B 2307/726; B32B 2439/40; B60K 15/03177; B60K 2015/03493; B29C 43/305; B29C 43/52; B29C 47/065; B29K 2023/065; B29K 2023/086; B29K 2995/0068; B29L 2031/7172
See application file for complete search history.

(56) References Cited

U.S. PATENT DOCUMENTS

| | | | |
|---|---|---|---|
| 5,928,745 | A | 7/1999 | Wood et al. |
| 2007/0218294 | A1 | 9/2007 | Emad et al. |
| 2007/0248779 | A1 | 10/2007 | Lio et al. |
| 2008/0197528 | A1 | 8/2008 | Wood |
| 2010/0011746 | A1 | 1/2010 | Lupescu |
| 2012/0040198 | A1 | 2/2012 | Ishihara et al. |

FOREIGN PATENT DOCUMENTS

| | | |
|---|---|---|
| CN | 102427942 | 4/2012 |
| DE | 10114872 A1 | 9/2002 |
| DE | 102004019875 A1 | 2/2005 |
| EP | 0952179 A2 | 10/1999 |
| FR | 2879716 A1 | 6/2006 |
| FR | 2965757 A1 | 4/2012 |
| WO | 9429378 A1 | 12/1994 |
| WO | 2006074997 A1 | 7/2006 |

(Continued)

OTHER PUBLICATIONS

Office Action from related Chinese Appln. No. 201480051710.5 dated Dec. 1, 2016. English translation attached.
Jianping et al., "Environmental Engineering Principles", Jun. 30, 2013, p. 213, China. Concise explanation of relevancy can be found on the English translation of the Chinese Office Action submitted herewith.
Xingguo, "Hydrogen and Hydrogen Energy", Sep. 30, 2012, pp. 195, 197-198, China. Concise explanation of relevancy can be found on the English translation of the Chinese Office Action submitted herewith.

(Continued)

*Primary Examiner* — Michael C Miggins
(74) *Attorney, Agent, or Firm* — Grossman, Tucker, Perreault & Pfleger, PLLC

(57) ABSTRACT

The present invention relates to a multilayer composite having barrier properties, objects, in particular fuel containers, comprising the same, a process for producing the multilayer composite or the objects comprising the same and also the use of the multilayer composite or the objects for reducing the emission of volatile organic compounds.

18 Claims, No Drawings

(56) References Cited

FOREIGN PATENT DOCUMENTS

WO 2007040609 A1 4/2007

OTHER PUBLICATIONS

English language translation with PCT International Search Report dated Nov. 14, 2014, received in corresponding PCT Application No. PCT/EP14/64907, 6 pgs.
English language translation of the International Preliminary Report on Patentability dated Jan. 21, 2016, received in corresponding PCT Application No. PCT/EP14/64907, 8 pgs.

MULTILAYERED COMPOSITE MATERIAL AND OBJECTS MADE THEREFROM

The present invention relates to a multilayer composite having barrier properties, objects, in particular fuel containers, comprising the same, a process for producing the multilayer composite or the objects comprising the same and also the use of the multilayer composite or the objects for reducing the emission of volatile organic compounds.

Plastics, in particular those based on polyolefin, for example polyethylene (PE), have many advantageous properties, including a low weight compared to metals, good corrosion resistance and greater flexibility in respect of shaping. For this reason, they are used for many applications, for example in the field of packaging, containers and packing drums, in particular also for solvent-containing chemicals and fuels. Thus, for example, a considerable weight reduction can be achieved by fuel tanks made of plastic (PFT), especially in the automobile sector, with more flexible shaping, reduced susceptibility to corrosion and increased crash safety compared to fuel tanks made of steel being achieved at the same time. However, plastics are to a certain extent permeable to volatile organic compounds (also referred to as VOC) which therefore can, if a concentration and/or pressure gradient is present on the two sides of the plastic wall, pass through the latter and thus be given off into the environment (known as permeation).

In order to reduce permeation of VOC through plastic walls and thus be able to satisfy the increasingly strict, especially in the automobile sector, emission limits for the release of fuel constituents through the walls and also closure and connection places of the fuel system, for example EPA tier 1 and 2, CARB (California Air Resources Board) LEV I, II and III and the European emissions standards III, IV, V and VI, various approaches have already been described in the prior art.

For example, DE 101 14 872 A1 pursues the approach of reducing the permeability of a plastic by filling the pores of the latter by addition of a finely particulate inorganic additive.

However, the plastic wall is usually provided with a polar layer, for example by fluorination of the surface in the case of single-layer fuel containers or introduction of an additional layer of a barrier material which displays a low absorption capability and permeability for VOC.

As barrier materials, use is made of, for example, ethylene-vinyl alcohol copolymers (EVOH) and polyvinylidene chloride (PVDC). EVOH is a random copolymer of ethylene and vinyl alcohol which is commercially available under the designation EVAL™ with various proportions of ethylene in the copolymer from Kuraray (Chiyoda, Japan). Compared to many other plastics, these copolymers display very good barrier properties in respect of VOC and very good thermoplastic processability and can generally be processed by extrusion, injection molding and also extrusion blow molding. The lower the proportion of ethylene in the copolymer, the higher is its barrier action in respect of VOC, but the processability and flexibility of the copolymer also decreases with a decreasing proportion of ethylene.

In view of, in particular, the increasing use of biofuels which contain a significant proportion of volatile organic compounds produced by means of biological processes, for example ethanol (e.g. E10 fuel having a proportion of from 5 to 10% of ethanol), butanols and/or various ether compounds in biofuels of the second and third generation, a further improvement in such barrier systems in plastics for the accommodation, passage or envelopment of substances which represent or contain volatile organic substances is necessary.

It was therefore an object of the present invention to provide a material for the accommodation, passage or envelopment of substances which represent or contain volatile organic compounds, which material has improved barrier properties, and also a process for the production thereof.

This object is achieved by the multilayer composite of the present invention, the objects which comprise this composite and also the process according to the invention for producing this multilayer material or these objects.

It has surprisingly been found that the release of volatile organic substances into the environment through a polymer-containing material, for example a film or a wall of a container, a pipe or a closure or other component of such a container can be minimized, i.e. the barrier properties of the polymer-containing material in respect of VOC can be improved, by an adsorption material being introduced into the polymer-containing material. This is all the more surprising since the adsorption materials for the purposes of the present invention preferably have a porous structure. In contrast to the previously described barrier materials already known from the prior art, the penetration of the volatile organic substances into the polymer-containing material is in principle not minimized here but instead the liberation of volatile organic substances which have already penetrated into the material into the environment is reduced.

Potentially porous adsorption materials such as zeolites have hitherto been used in polymers, in particular those which have been used for producing plastic fuel tanks, mainly as fillers and stabilizers, as described, for example, in DE 10 2004 019 875 A1, or if need be for minimizing the emission of aldehydes which are formed in the polymer itself during synthesis, processing and storage and can be liberated from the polymer, e.g. formaldehyde or acetaldehyde from polyesters, as described, for example, in WO 94/29378 A1 and WO 2006/074997 A1.

The present invention therefore provides a multilayer composite having barrier properties for volatile organic compounds, which has a first surface and a second surface and comprises at least one first layer and at least one further layer, wherein one of the two layers comprises at least one adsorption material for volatile organic compounds and at least one polymeric support material in admixture with or bonded to the adsorption material, where if the at least one adsorption material and the at least one polymeric support material are bonded to one another, the multilayer composite of the invention comprises at least three layers, where the polymeric support material is selected from the group consisting of elastomers, thermoplastics and thermoplastic elastomers and mixtures thereof.

For the purposes of the present invention, the term multilayer composite refers to a material in which at least two layers having a different chemical composition are joined in direct contact with one another. In this composite material, preference is given to at least two layers which have a different chemical composition and both comprise at least one polymer, where these polymers are each preferably selected independently from the group consisting of elastomers, thermoplastics and thermoplastic elastomers, being joined in direct contact with one another.

The composite of the present invention comprises at least two different layers of which one contains an adsorption material within the meaning of the present invention. The at least one further layer preferably does not comprise any adsorption material within the meaning of the present invention. If adsorption material and support material are not present in admixture in a layer but are instead bonded to one another, i.e. the adsorption material is present in a separate layer on and/or under a layer of support material, the composite of the invention comprises at least three layers of which two in any case preferably do not comprise any adsorption material within the meaning of the present invention.

However, the composite of the invention can also comprise more than two or, in the case of a bonded assembly of adsorption and support material, more than three layers, for example a total of three, four, five, six, seven, eight, nine, ten, eleven, twelve, 13, 14, 15 or more layers, particularly preferably five, six or seven layers. These layers can in principle have the same chemical composition or different chemical compositions, with the proviso that the chemical composition of two layers which are in direct contact with one another is in each case different. With the exception of the layer comprising adsorption material in the case of a bonded assembly of adsorption and support material, all layers preferably comprise at least one polymer.

If the composite of the invention comprises more than two or, in the case of a bonded assembly of adsorption and support material, more than three layers, it is also possible for more than one, for example two or three, layers comprising adsorption material to be present.

For the purposes of the present invention, volatile organic compounds are organic compounds which have a vapor pressure of at least 0.01 kPa at 20° C. (293.15 K). The volatile organic compounds in each case preferably have from 1 to 16, more preferably in each case from 1 to 12 and particularly preferably from 1 to 8, carbon atoms. The volatile organic compounds are preferably selected from the group consisting of acyclic and cyclic aliphatic and aromatic, optionally branched and/or halogenated hydrocarbons and heteroaromatic compounds, alcohols, acetals, ketones, ethers, carboxylic acids and mixtures thereof. The volatile organic compounds can also comprise aldehydes, mixtures of such aldehydes and mixtures of such aldehydes with the abovementioned preferred volatile organic compounds.

The abovementioned hydrocarbons preferably encompass n-alkanes, isoalkanes, cycloalkanes and also n-alkenes, isoalkenes, cycloalkenes, in each case having one or more C=C double bonds, and aromatic hydrocarbons, in particular those having from 1 to 16, preferably from 1 to 12, more preferably from 4 to 12 and particularly preferably from 4 to 8 carbon atoms, in particular methane, ethane, propane, n-butane, i-butane, n-pentane, i-pentane, neopentane (2,2-dimethylpropane), cyclopentane, methylcyclopentane, n-hexane, 2-methylpentane, 3-methylpentane, 2,2-dimethylbutane, 2,3-dimethylbutane, cyclohexane, methylcyclohexane, n-heptane, 2-methylhexane, 3-methylhexane, 2,2-dimethylpentane, 2,3-dimethylpentane, 2,4-dimethylpentane, 3,3-dimethylpentane, 3-ethylpentane, 2,2,3-trimethylbutane, n-octane, 2-methylheptane, 3-methylheptane, 4-methylheptane, 2,2-dimethylhexane, 2,3-dimethylhexane, 2,4-dimethylhexane, 2,5-dimethylhexane, 3,3-dimethylhexane, 3,4-dimethylhexane, 3-ethylhexane, 2,2,3-trimethylpentane, 2,2,4-trimethylpentane (isooctane), 2,3,3-trimethylpentane, 2,3,4-trimethylpentane, 3-ethyl-2-methylpentane, 3-ethyl-3-methylpentane, 2,2,3,3-tetramethylbutane, ethene, propene, 1-butene, 2-butene, 2-methylprop-1-ene, butadiene, 1-pentene, 2-pentene, 2-methylbut-1-ene, 2-methylbut-2-ene, 3-methylbut-1-ene, cyclopentene, 1,3-pentadiene, 1,4-pentadiene, cyclopentadiene, 1-hexene, 2-hexene, 3-hexene, 2-methylpent-1-ene, 2-methylpent-2-ene, 3-methylpent-1-ene, 3-methylpent-2-ene, 4-methylpent-1-ene, 4-methylpent-2-ene, 2-ethylbut-1-ene, 2,3-dimethylbut-1-ene, 2,3-dimethylbut-2-ene, 3,3-dimethylbut-1-ene, cyclohexene, 1,3-cyclohexadiene, benzene, toluene, o-xylene, m-xylene, p-xylene, ethylbenzene, 3-ethyltoluene, 1,2,4-trimethylbenzene, 1,3,5-trimethylbenzene and styrene and also mixtures thereof, without being restricted thereto. It goes without saying that the lower limit to the carbon atoms in the molecule is determined by the chemical structure of the hydrocarbon and, for example, in the case of olefins is at least 2 and in the case of homoaromatic hydrocarbons is at least 6 carbon atoms. Among the abovementioned hydrocarbons, particular preference is given to n-butane, n-pentane, n-hexane, n-heptane, n-octane, i-butane, i-pentane, 2-methylpentane, 3-methylpentane, 2-methylhexane, 3-methylhexane, 2,2-dimethylpentane, 2,2,3-trimethylbutane, 2,2,4-trimethylpentane (isooctane), cyclopentane, methylcyclopentane, cyclohexane, methylcyclohexane, benzene, toluene, ethylbenzene, o-xylene, m-xylene, p-xylene, 3-ethyltoluene, 1,2,4-trimethylbenzene, 1,3,5-trimethylbenzene, 2-pentene, 2-methylbut-2-ene, 2-methylpent-2-ene and cyclopentene and also mixtures thereof.

The abovementioned alcohols encompass monohydric and polyhydric, for example diols, acyclic and cyclic aliphatic and (hetero)aromatic alcohols, in particular those having from 1 to 16, preferably from 1 to 10 and particularly preferably from 1 to 8, carbon atoms, for example methanol, ethanol, 1-propanol, 2-propanol, butanols such as 1-butanol, 2-butanol and 2-methyl-1-propanol, 2-methyl-1-butanol, ethanediol, 1,2-propanediol, 1,3-propanediol, butanediols such as 1,2-butanediol, 1,3-butanediol and 1,4-butanediol, without being restricted thereto. Among the abovementioned alcohols, particular preference is given to ethanol, 1-butanol, 2-butanol and 2-methyl-1-propanol, 1,2-butanediol, 1,3-butanediol and 1,4-butanediol.

The abovementioned acetals, ketones, ethers and carboxylic acids can also be acyclic and cyclic, aliphatic and (hetero)aromatic compounds which preferably have from 1 to 16, more preferably from 1 to 10 and particularly preferably from 1 to 8 carbon atoms in the case of the aldehydes and carboxylic acids, and in the case of ethers, acetals and ketones preferably have from 2 or 3 to 16, more preferably from 2 or 3 to 10 and particularly preferably from 2 or 3 to 8 carbon atoms. The ketones, acetals and ethers can be symmetrically or else unsymmetrically substituted. The abovementioned acetals, ketones, ethers, aldehydes and carboxylic acids can preferably comprise, for example, formaldehyde, acetaldehyde, propanal, propenal, butanal, ethenone, acetone, ethyl methyl ketone, dimethyl ether, ethyl methyl ether, methyl tert-butyl ether (MTBE), ethyl tert-butyl ether (ETBE), di-n-butyl ether, tert-amyl methyl ether (TAME), furans and tetrahydrofurans such as 2,5-dimethylfuran, tetrahydrofuran and 2-methyltetrahydrofuran, formic acid and acetic acid and also mixtures thereof, without being restricted thereto. Among the abovementioned acetals, ketones, ethers, aldehydes and carboxylic acids, particular preference is given to MTBE, ETBE, TAME, di-n-butyl ether, 2,5-dimethylfuran, tetrahydrofuran and 2-methyltetrahydrofuran.

In particular, the VOCs are ones which can, owing to their low boiling point or their high vapor pressure in accordance with the abovementioned definition, be liberated from a hydrocarbon-containing substance under use conditions. Furthermore, these are preferably compounds which, if they are stored in a plastic container comprising polyethylene and having a wall thickness of 3 mm at room temperature, exit by permeation through the wall of the container into the environment unless suitable measures for treating the container are undertaken. In particular, these are compounds which display a permeation of more than 0.1 mg of this substance through the test plate per day in permeation measurements in accordance with the micro-SHED method (SHED: Sealed Housing for Evaporative Determination), as described in the SAE Technical Paper 2001-01-3769 "Innovative Testing Device for Ultra-Low Fuel Permeation Systems", at a constant temperature of 40° C. using test plates composed of HDPE (Lupolen 4261 AG from LyondellBasell Industries, Rotterdam, the Netherlands) having a thickness of 3 mm using the corresponding compound as volatile test substance.

The volatile organic compound(s) is/are preferably not, or in any case mostly (i.e. >50% by weight, preferably >75% by weight, more preferably >90% by weight and in particular >99.5% by weight, based on the total mass of the adsorbed organic compounds) not, ones which are liberated from the composite, for example monomers which have not reacted in the synthesis of a polymer or volatile reaction products liberated, but instead one or more compounds which are liberated from a preferably liquid or gaseous hydrocarbon-containing substance which is in contact with the composite but is not a constituent thereof.

For the purposes of the present invention, hydrocarbon-containing substances are both individual substances and mixtures of substances which comprise at least one hydrocarbon, e.g. solvents, solvent mixtures and solvent-containing substances, for example surface coating compositions, cleaners, etc., and in particular fuels of fossil, biogenic or synthetic origin and also mixtures thereof, for example gasoline, diesel, natural gas, liquefied petroleum gas (LPG), compressed natural gas (CPG), liquefied natural gas (LNG) and mixtures thereof. The hydrocarbon-containing substance is particularly preferably a fuel for automobiles which is liquid at room temperature (20° C.) and atmospheric pressure (1013.25 hPa).

For the purposes of the present invention, an adsorption material is a solid material which is able to accumulate volatile organic compounds on its surface. In the context of adsorption materials, the term surface also refers, in particular, to the internal surface which in the case of typical adsorption materials is large compared to the external surface because of the porosity of these materials. The accumulation of the volatile compounds as adsorbate on the surface of the adsorption material can in principle be based on van der Waals forces, dipole interactions, electrostatic interactions, hydrogen bonds and the formation of ionic and/or covalent chemical bonds between the adsorption material (adsorbent) and the adsorbate. Depending on the strength of the interactions between adsorbate and adsorbent, a distinction is made here between physisorption and chemisorption. The accumulation of the volatile organic compounds on the adsorption material within the meaning of the present invention can in principle be based on physisorption and/or chemisorption. However, for the purposes of the present invention, the bonding of the volatile organic compounds to the adsorption material is preferably not based on the formation of covalent chemical bonds between the adsorption material and these organic compounds. The adsorption material used is therefore preferably not any material containing embedded compounds or substituents which undergo a chemical reaction with the volatile organic compounds.

The term elastomers refers to polymers which have rubbery-elastic behavior and can be repeatedly elastically deformed at room temperature (20° C.) under tensile and compressive stress, but (relatively quickly) regain approximately their initial shape after release of the external force required for deformation. Examples of elastomeric polymers encompass, in particular, the rubbers and silicones described in more detail below.

The term thermoplastics refers to polymers which have a flow transition region in which they can be deformed above the use temperature (generally at least room temperature). The transition into the molten state is reversible and can be repeated as often as desired by cooling and heating (provided that no thermal decomposition of the material due to overheating takes place). Thermoplastics can be processed by pressing, extrusion, injection molding, blow molding and further shaping processes to produce moldings and can be welded under the action of pressure and heat.

Examples of thermoplastic polymers encompass, inter alia, polyoxymethylene (POM), polyethylene (PE), including polyethylene of high and low density and also low density linear polyethylene (HDPE, LDPE and LLDPE, respectively), polypropylene (PP), polyamide (PA), polyethylene terephthalate (PET), polybutylene terephthalate (PBT), acrylonitrile-butadiene-styrene (ABS), polystyrene (PS), polycarbonate (PC), polytetrafluoroethylene (PTFE), styrene-acrylonitrile copolymer (SAN), polyphenylene ether (PPE), polyether ether ketone (PEEK), polyether sulfone (PES), polyvinyl chloride (PVC), polysulfone (PSU), polymethyl methacrylate (PMMA) and mixtures (blends) thereof, for example PPO/PS or PC/ABS, without being restricted thereto.

For the purposes of the present invention, thermoplastic elastomers are polymers or mixtures of polymers (blends) which behave like classic elastomers at room temperature but when heated display thermoplastic behavior, i.e. become deformable. Thermoplastic elastomers contain soft, elastic segments/regions having a high extensibility and low glass transition temperature $T_g$ and also hard, crystallizable segments/regions having a tendency to associate formation, low extensibility and high glass transition temperature $T_g$, which are present as individual, not intermeshing phases. These can be present within a polymer, for example, in the form of block copolymers, or in a (micro)heterogeneous phase distribution in polymer blends.

Examples of suitable block copolymers are styrene-olefin-block copolymers, e.g. styrene-butadiene-styrene block copolymers (SBS), styrene-isoprene-styrene block copolymers (SIS), styrene-ethylenebutylene-styrene block copolymers (SEBS), polyether esters, polyether amides, particular polyurethanes and copolyamides. Suitable polymer blends comprise, for example, mixtures of elastomers such as ethylene-propylene-diene rubber with propylene (PP/EPDM).

The layer comprising adsorption material can comprise the at least one adsorption material and the at least one polymeric support material in admixture or in bonded form. If the at least one adsorption material and the at least one support material are used in admixture, the at least one adsorption material can have been added to the mixture of the monomers and/or prepolymers to be polymerized before or during the polymerization or be mixed with the at least one polymer after preparation of the latter, for example by mixing of melts. For the purposes of the invention, prepolymers are oligomeric or else polymeric compounds which serve as precursors or intermediates in the synthesis of polymers and are reacted to form higher molecular weight polymeric compounds.

The at least one adsorption material can, however, also be applied in the form of a coating to at least one surface of at least one support material layer, optionally using suitable bonding agents, for example in the form of a dispersion of the adsorption agent in a suitable dispersion medium or by means of a sol-gel process. Suitable processes for applying surface coatings using dispersions or sols, for example by means of painting, rolling, doctor blade coating, squirting, spraying, dipping, curtain coating and combinations thereof, without being restricted thereto, are known to those skilled in the art. In this case, the adsorption material and the support material are present as a bonded assembly comprising at least two layers, namely at least one layer comprising at least one support material and at least one layer comprising the adsorption material but no polymer as support material and optionally at least one further layer comprising a bonding agent, if present. Furthermore, the layer comprising adsorption material can also be introduced between at least two layers comprising support material, and this too optionally with use of suitable bonding agent layers.

If a plurality of different adsorption materials are used, these can be present together in one layer and/or in separate layers. These layers can in each case, independently of one another, contain the respective adsorption material in admixture with at least one polymeric support material, or a layer of the respective adsorption material can be bonded to at least one layer comprising support material, as already described above.

The content of adsorption material in the layer comprising adsorption material, if adsorption material and support material are present in admixture in one layer, or in the bonded assembly of the layer comprising adsorption material and the layer comprising support material is preferably from 0.001 to 80% by weight, more preferably from 0.01 to 60% by weight, particularly preferably from 0.1 to 50% by weight and in particular from 1 to 30% by weight, from 2.5 to 20% by weight or from 5 to 15% by weight, in each case based on the total weight of adsorption material and polymeric support material in the layer containing the adsorption material and the support material in admixture or in the bonded assembly of adsorption material and support material.

The at least one adsorption material is preferably selected from the group consisting of sheet and framework silicates, porous carbon materials and metal organic frameworks (MOF). Furthermore, the adsorption material preferably comprises a porous material which is particularly preferably selected from the group consisting of activated carbon, covalent organic frameworks (COF), porous silicates, metal organic frameworks (MOF) and mixtures thereof and in particular from the group consisting of zeolites and metal organic frameworks (MOF) and mixtures thereof.

For the purposes of the present invention, a material is referred to as porous when it has voids filled with air or other different materials in its interior and/or at its surface. The porosity is a dimensionless measure of the ratio of void volume to total volume of the material, i.e. the sum of void volume and pure volume of the material. The adsorption material used for the purposes of the invention preferably has a porosity of at least 5%, preferably at least 10%, more preferably at least 20%, particularly preferably at least 30% and in particular at least 40%. The porosity of adsorption materials is naturally less than 100%. The adsorption material used for the purposes of the invention usually has a porosity of up to 95%, 90%, 85%, 80%, 75%, 70% or 65%, determined by means of mercury intrusion in accordance with DIN 66133, with the contact angle of the mercury with the material surface being set to $\theta=140°$ and the surface tension to $\sigma=0.48$ N/m for comparison of the materials with one another. According to DIN 66133, the open pores of a material are measured, i.e. pores which are connected to the surroundings and one another. The values indicated therefore relate to the porosity based on the open pores of the material.

Depending on the pore diameter, porous materials are referred to as microporous (pore diameter below 2 nm), mesoporous (pore diameter from 2 to 50 nm) and macroporous (pore diameter above 50 nm) materials. The adsorption materials used for the purposes of the invention are preferably microporous materials, i.e. materials in which the majority of the pores have a pore diameter below 2 nm, determined by means of micropore analysis by gas adsorption by the Horvath-Kawazoe and Sito-Foley method in accordance with DIN 66135-4. Here, the Horvath-Kawazoe method is used for carbon-based adsorption materials which have predominantly slit-shaped pores, for example activated carbons. The Sito-Foley method is used for microporous adsorption materials which have predominantly cylindrical pores, for example zeolites. As an alternative, when the prevailing pore shape is not known, the pore distribution can be determined by means of mercury intrusion in accordance with DIN 66133 subject to the abovementioned conditions.

For the purposes of the present invention, porous carbon materials encompass, in particular, activated carbon and covalent organic frameworks (COF).

The term activated carbon refers to carbon structures made up of very fine graphite crystals and amorphous carbon and having a porous open-pored structure and a high specific surface area which is usually at least 200 $m^2/g$ and is generally in the range from 300 to 2000 $m^2/g$. Activated carbons which are suitable as adsorption materials for the purposes of the present invention are, for example, commercially available under the trade names BAX®, for example BAX® 1100 and BAX® 1500 (Meadwestvaco, Richmond, Va., USA), and Norit®, for example Norit® CNR 115 and Norit® CN 520 (Norit Americas Inc., Marshall, Tex., USA).

Covalent organic frameworks (COF) for the purposes of the invention are porous, crystalline, three-dimensional organic structures in which organic molecules, known as secondary building units, are joined by covalent chemical bonds, with the resulting framework not containing any metals (for the present purposes, this definition explicitly does not include the semi-metal boron). Such materials are described, for example, by X. Feng et al. in *Chem. Soc. Rev.* 2012, 41, 6010-6022 and the literature references cited there.

Suitable sheet silicates (phyllosilicates) are naturally occurring and synthetic, optionally organically modified sheet silicates such as talc or montmorillonite and also naturally occurring minerals containing sheet silicates, for example bentonite. Suitable sheet silicates are also, in particular, sheet silicates in the form of nanoclays which comprise nanoparticles of sheet silicates.

Suitable framework silicates (tectosilicates) are naturally occurring and synthetic, optionally organically modified framework silicates such as feldspar and zeolites, which are described in more detail below.

Zeolites are microporous crystalline aluminosilicates which occur in nature in numerous modifications and can also be prepared synthetically. In zeolites, $SiO_4^-$ and $AlO_4^-$ tetrahedra are linked via oxygen bridges in such a way that ordered channel and cage structures are formed. Owing to their ability to be able to separate molecules selectively according to size because of their regular pore size distribution, they are also referred to as molecular sieves. The maximum size of a species, i.e. a molecule, ion or complex, which can penetrate into the interior of these pores is determined by its kinetic diameter.

Zeolites can be subsumed under the general formula $M^{n+}{}_{x/n}[(AlO_2)^-{}_x(SiO_2)_y]\odot zH_2O$, in which M is usually the exchangeable alkali metal or alkaline earth metal cations, for example $Na^+$, $K^+$, $Ca^{2+}$, $Ba^{2+}$, or else can be $H^+$ or (less preferably) $NH_4^+$; n is the charge on the cation and is usually 1 or 2 and z is the number of water molecules taken up by the crystal. The molar ratio of $SiO_2$ to $AlO_2$ (y/x), also referred to as modulus, is usually in the range from 1 to 100.

For the purposes of the present invention, particular preference is given to using zeolites having a pore diameter in the range from 0.3 to 0.7 nm or else mixtures of zeolites having different structures and optionally also pore diameters, but where the pore diameter of each individual zeolite in this particularly preferred embodiment is likewise in the range from 0.3 to 0.7 nm, as adsorption material.

Suitable zeolites encompass, for example, zeolite A in the calcium form (MS 5A), sodium form (MS 4A) and/or potassium form (MS 3A), zeolite L, X or Y, zeolites of the type Y having a reduced aluminum content (dealuminized NaY zeolites/DAY), ZSM-5, chabazite-M, mordenite, faujasite and mixtures thereof.

Metal organic frameworks (MOF) for the purposes of the present invention are microporous crystalline materials which consist of metal ions and organic linkers, i.e. organic molecules which can coordinate at least two of these metal ions, and thus form porous three-dimensional structures. The size and structure of the pores in the MOF can be set in a targeted manner by suitable selection of the metals and the organic linkers. In this way, it is possible to achieve specific surface areas of often far above $1000 \, m^2 \cdot g^{-1}$. Suitable metals encompass, for example, aluminum, but also transition metals such as iron, copper, manganese, cobalt, indium, zinc or mixtures thereof. Suitable linkers encompass, for example, dicarboxylic, tricarboxylic or tetracarboxylic acids, e.g. oxalic acid, fumaric acid, malonic acid, succinic acid, glutaric acid, phthalic acid, isophthalic acid, terephthalic acid, diazoles and triazoles, for example imidazole or 1,2,3-triazole.

The synthesis of suitable metal organic frameworks is described in the literature. In addition, MOFs are now also commercially available, for example under the trade names BASOLITE™ A100, C300 and Z1200 from BASF (Ludwigshafen, Germany).

Suitable MOFs are, for example, zeolitic imidazolate frameworks (ZIF). These consist of tetrahedrally coordinated transition metal ions such as iron, cobalt, copper, manganese, indium or zinc which are joined via organic imidazole linkers. Since the metal-imidazole-metal angle is similar to the silicon-oxygen-silicon angle of 145° in zeolites, ZIFs have a structure which is topologically isomorphous to that of zeolites. The synthesis of suitable ZIFs having a defined pore size has been described, for example, by K. S. Park et al. in PNAS 2006, 103, 10186-10191. Preference is also given to MOFs based on aluminum fumarate, for example as described in WO 2012/042410 A1.

Matching of the adsorption material to the compounds to be adsorbed allows the adsorption of the volatile organic compounds to be optimized. It is also possible to use mixtures of various adsorption materials in order to match the adsorption properties of the composite of the invention to mixtures of volatile organic compounds. Preferred adsorption materials for methanol and ethanol are, for example, zeolite A in the calcium form (MS 5A), sodium form (MS 4A) and/or potassium form (MS 3A), ZSM-5 [$Na_nAl_nSi_{96-n}O_{192}.16H_2O$ where $0<n<27$] and chabazite-M [$(Na_2,K_2,Ca,Sr)Al_2Si_4O_{12}.16H_2O$], for n- and isoalkanes ZSM-5, for toluene zeolite X or Y and faujasite [$(Na, Ca_{0.5}Mg_{0.5},K)_x(Al_xSi_{12-x}O_{24}).16H_2O$] with different silicon-aluminum ratios (x usually in the range from 3.2 to 3.8) and charge compensation by metal cations such as $Li^+$, $Na^+$, $K^+$, $Rb^+$ and $Cs^+$.

The specific surface area of the at least one adsorption material is preferably at least $10 \, m^2/g$, preferably at least $50 \, m^2/g$, more preferably at least $100 \, m^2/g$ and particularly preferably at least $200 \, m^2/g$. Preference is also given to even higher values such as at least 300, 400 or $500 \, m^2/g$, determined in accordance with ISO 9277:2010 (BET). The maximum specific surface area of the adsorption material used is determined essentially only by the type of adsorption material used and is in any case usually below $15000 \, m^2/g$.

The adsorption material preferably has pores having a diameter in the range from 0.1 to 10 nm, preferably in the range from 0.2 to 5 nm, more preferably from 0.25 to 2 nm, particularly preferably from 0.3 to 1 nm and in particular from 0.3 to 0.7 nm, determined in accordance with DIN 66134 and DIN 66135, as indicated above.

The adsorption material is preferably used in the form of particles or agglomerates of particles which preferably have a size in the range from 0.02 to 2000 μm, more preferably in the range from 0.2 to 1000 μm and in particular in the range from 1 to 500 μm, for example in the range from 1 to 10 μm, from 10 to 50 μm or from 50 to 500 μm, determined in accordance with ISO 13320:2009 by means of laser light scattering (LALLS, low angle laser light scattering) using a Malvern Mastersizer 2000 (Malvern Instruments Ltd., Malvern, Worcestershire, Great Britain).

The at least one further layer in the composite of the invention, which preferably does not contain any adsorption material and is also not a direct support layer for the adsorption material in the above-described bonded assembly of adsorption material and support material, preferably likewise comprises at least one polymeric material which is particularly preferably likewise selected from the group consisting of elastomers, thermoplastics and thermoplastic elastomers.

These polymeric materials can be homopolymers, copolymers or else a mixture of homopolymers and/or copolymers. For the purposes of the present invention, copolymers are random polymers, sequential copolymers, block copolymers or graft copolymers. Examples of suitable copolymers have already been mentioned above.

Suitable grafting agents encompass, for example, maleic acid, maleic anhydride and/or acrylic acid.

The polymeric material of the layer comprising adsorption material or of the bonded assembly comprising adsorption material with the support material and/or the further layer can preferably be selected independently from the group consisting of optionally substituted or modified polyolefins, polyamides, polyesters, polycarbonates, polyurethanes, polyureas, polyethers, polyimides, polyacetals, rubbers, silicones and also copolymers and mixtures thereof, more preferably from the group consisting of optionally substituted or modified polyolefins such as polyethylene, polypropylene and also copolymers and mixtures thereof. The polymeric material of in any case one layer of the composite of the invention particularly preferably comprises polyethylene (PE), in particular high density polyethylene (HDPE).

Preference is given to each of the layers in the composite of the invention (with the exception of layers which contain adsorption material but no polymer) comprising at least one polymer selected independently from the group consisting of elastomers, thermoplastics and thermoplastic elastomers and mixtures thereof, more preferably selected from among the above-described polymers.

For the purposes of the invention, substituted and modified polymers are polymers which, in addition to the units which originate from the monomer(s) which give(s) the polymer its name, comprise further monomeric units having functional groups as substituents. These can be present in the main chain and/or in the side chains and be introduced into the polymer during the polymerization of the monomers respectively giving the polymer its name or subsequently by grafting or be produced by chemical transformation of particular functional groups of the polymer.

Preferred elastomers for the purposes of the present invention are rubbers of natural or synthetic origin, for example natural rubber (NR), polyisoprene rubber (IR), butadiene rubber (BR), styrene-butadiene rubber (SBR), ethene-propene rubber (EPM), ethylene-propylene-diene rubber comprising dienes such as norbornene, hexadiene or dicyclopentadiene (EPDM), chloroprene rubber (CR), nitrile rubber (NBR) obtained by copolymerization of acrylonitrile and 1,3-butadiene, mixtures (blends) of nitrile rubber and polyvinyl chloride (NBR/PVC), hydrogenated acrylonitrile-butadiene rubber (HNBR), chlorosulfonated polyethylene (CSM), acrylate rubber (ACM), ethylene-acrylate rubber (AEM), polyurethane rubber (PUR), polyester-urethane rubber (AU, EU), ethylene oxide-epichlorohydrin rubber (ECO), fluoro rubber (FPM/FKM), perfluoro rubber (FFKM) and also silicones (sometimes also referred to as silicone rubbers), for example methylpolysiloxane (MQ), vinylmethylpolysiloxane (VMQ), phenylvinylmethyl-polysiloxane (PVMQ), fluoromethylpolysiloxane (FVMQ) and mixtures thereof, without being restricted thereto.

Furthermore, the polymer can contain fillers and reinforcing materials, for example synthetic fibers and fibers of natural origin, including glass fibers, hemp, carbon fibers, aluminum oxide fibers, ceramic fibers, asbestos fibers, gypsum fibers, aramid fibers, metal fibers and mixtures thereof, without being restricted thereto. Nonfibrous fillers encompass, for example, boron nitride, sulfates, carbon black, silicon dioxide, graphite and mixtures thereof, without being restricted thereto. Furthermore, the polymeric support material can also contain further additives and modifiers, for example lubricants, mold release agents, nucleating agents, dyes and color pigments, stabilizers, antioxidants, light stabilizers, flame retardants, biocides, bonding agents, antistatics, wetting agents, plasticizers, impact modifiers, crosslinkers or mixtures thereof, without being restricted thereto.

The at least one further layer of the composite preferably comprises at least one polymeric material which has barrier properties in respect of volatile organic compounds. For the purposes of the present invention, polymeric materials having barrier properties are polymers which, compared to a chemically unmodified high density polyethylene, display, at the same layer thickness under identical test conditions, a lower permeation for VOC, for example in a 24 h diurnal cycle in accordance with § 86.1233-96 "Diurnal Emission Test" in Title 40, Chapter I, Subchapter C, Part 86, Subpart M of the Code of Federal Regulations of the US Government (corresponding to the 24 h temperature cycle of the EPA or the CARB) or preferably the above-described micro-SHED test method. Such polymeric materials are known to those skilled in the art and encompass, for example, polyamide (PA), ethylene-vinyl alcohol copolymer (EVOH), polyvinylidene chloride (PVDC) and fluorinated or sulfonated polyethylene, preferably EVOH. The synthesis and processing of such polymers are known to those skilled in the art; such polymers are also commercially available, as already mentioned at the outset.

Particularly preferably, it is possible to use, for example, the following layer structure of the multilayer composite of the invention: a barrier layer of ethylvinyl alcohol (EVOH), which is provided on both sides with a bonding layer (HV) in order to bring about adhesion of this barrier layer to the HPDE, is inserted between two layers of high density polyethylene (HDPE). For economic and ecological reasons, it is possible, especially in layers which are not located on one of the two outer surfaces of the multilayer structure and are in contact with the surroundings, to use a regrind layer (RG) instead of or in addition to an HDPE layer composed of fresh product (known as virgin HDPE), so that, for example, the following layer structures preferably result, where AMTM* represents either a layer comprising a mixture of at least one adsorption material within the meaning of the present invention and at least one support material for this (AMTM) or a bonded assembly of adsorption material and support material (AM/TM; TM/AM or TM/AM/TM): HDPE/HV/EVOH/HV/AMTM*, HDPE/RG/HV/EVOH/HV/AMTM*, HDPE/HV/EVOH/HV/HDPE/AMTM*, HDPE/HV/EVOH/HV/AMTM*/HDPE, HDPE/RG/HV/EVOH/HV/HDPE/AMTM*, HDPE/RG/HV/EVOH/HV/AMTM*/HDPE, HDPE/HV/EVOH/HV/RG/AMTM*, HDPE/HV/EVOH/HV/AMTM*/RG, HDPE/RG/HV/EVOH/HV/RG/AMTM*, HDPE/RG/HV/EVOH/HV/AMTM*/RG, HDPE/HV/EVOH/HV/RG/HDPE/AMTM*, HDPE/HV/EVOH/HV/RG/AMTM*/HDPE, HDPE/RG/HV/EVOH/HV/RG/HDPE/AMTM* and HDPE/RG/HV/EVOH/HV/RG/AMTM*/HDPE, without being restricted thereto.

The layer which is denoted by AMTM* and is composed of at least one adsorption material and at least one support material for this (AMTM) or the corresponding bonded assembly of adsorption material and support material can also be joined via one or more bonding layers (HV) to the other layers, which can result in, for example, the following layer structures: HDPE/HV/EVOH/HV/AMTM*, HDPE/RG/HV/EVOH/HV/AMTM*, HDPE/HV/EVOH/HV/HDPE/HV/AMTM*, HDPE/HV/EVOH/HV/AMTM*/HV/HDPE, HDPE/RG/HV/EVOH/HV/HDPE/HV/AMTM*, HDPE/RG/HV/EVOH/HV/AMTM*/HV/HDPE, HDPE/HV/EVOH/HV/RG/HV/AMTM*, HDPE/HV/EVOH/HVAMTM*/HV/RG, HDPE/RG/HV/EVOH/HV/RG/HV/AMTM*, HDPE/RG/HV/EVOH/HV/AMTM*/HV/RG, HDPE/HV/EVOH/HV/RG/HDPE/HV/AMTM*, HDPE/HV/EVOH/HV/RG/HV/AMTM*/HV/HDPE, HDPE/RG/HV/EVOH/HV/RG/HDPE/HV/AMTM* and HDPE/RG/HV/EVOH/HV/RG/HV/AMTM*/HV/HDPE, without being restricted thereto.

The respective bonding agents in the individual layers in which these bonding agents are present can be identical or different.

In the regrind layer, it is possible not only to use milled "pure" HDPE production residues, i.e. material into which no further additives have been mixed or which has not been coextruded with further material, but also, for example, milled production residues from a coextrusion process. Since all layers of a coextrudate are milled, a certain proportion of adsorption material from the AMTM* layer of the former coextrudate is in this case inevitably introduced into the regrind layer (RG) when a regrind of such a coextrudate is used. However, in particular, adsorption material can preferably also be added in a targeted manner to a regrind layer which is located behind the barrier layer (viewed from the surface of the composite which is in contact with the hydrocarbon-containing substance); in this case, the HDPE which is already present in the regrind functions as support material for the adsorption material (RG(AM)). This gives the layer structures which are preferred for the purposes of the present invention: HDPE/HV/EVOH/HV/RG(AM), RG/HV/EVOH/HV/RG(AM), HDPE/RG/HV/EVOH/HV/RG(AM), HDPE/HV/EVOH/HV/RG(AM)/HDPE and HDPE/RG/HV/EVOH/HV/RG(AM)/HDPE, among which the 6- and 7-layer structures HDPE/HV/EVOH/HV/RG(AM)/HDPE and HDPE/RG/HV/EVOH/HV/RG(AM)/HDPE, in particular, are particularly preferred.

In the above representation of the layer structure, the surface of the composite which is in contact with the hydrocarbon-containing substance within the meaning of the present invention is preferably located at the left-hand end, while the surface of the composite which is in contact with the surroundings is located at the right-hand end. Further layers can be present at both ends of the layer structures shown above. In any case, the above bonded assembly of HDPE, bonding agent, EVOH and regrind layers is preferably produced by the coextrusion process, while further layers, including the layer comprising adsorption material, can be coextruded at the same time or else be applied subsequently by processes known to those skilled in the art, e.g. injection molding, surface coating, lamination, etc.

The layer comprising adsorption material, in particular, is preferably located neither directly on the first nor directly on the second surface of the multilayer composite of the invention, but is instead covered by at least one further layer, particularly preferably a further layer composed of polymeric material which can be identical to or different from the support material of the layer comprising adsorption material, for example a further HDPE layer or a surface coating layer. In this way, it is possible to prevent or at least minimize the adsorption of water or water vapor from the surroundings, especially when hydrophilic adsorption materials are used.

The multilayer material of the present invention is particularly suitable for the accommodation, passage and/or envelopment of substances which comprise volatile organic compounds.

The present invention therefore further provides an object for the accommodation, passage or envelopment of substances which comprise volatile organic compounds, comprising the multilayer composite of the invention.

This object can preferably be a film, a pipe, a hollow body or a closure or other component for such a hollow body, preferably a hollow body, a closure or other component for this.

Such hollow bodies can preferably be containers for the storage and transport of solid, gel-like, paste-like and liquid, in particular liquid, materials, for example fuels, household chemicals and industrial chemicals, including solvents and cleaners, or else cosmetics, encompassing, for example, bottles, canisters, tanks, drums, etc., without being restricted thereto, and also closure or other components for these. Closure or other components for such hollow bodies can be, for example, feed lines and discharge lines, lids, valves and seals, without being restricted thereto. The object according to the invention is particularly preferably a fuel container.

In the object according to the invention, the at least one further layer of the composite preferably comprises at least one polymeric material which has barrier properties in respect of volatile organic compounds. As already stated above, this is preferably selected from the group consisting of polyamide (PA), ethylene-vinyl alcohol copolymer (EVOH), polyvinylidene chloride (PVDC) and fluorinated or sulfonated polyethylene. Here, the composite is preferably arranged in the object according to the invention in such a way that the layer which comprises the polymeric material having barrier properties is located closer to the surface of the object which is provided for contact with the VOC-comprising substance than the layer comprising adsorption material. This ensures that a large part of the VOC has been prevented from permeating through the composite by the material having barrier properties. The part of the VOC which nevertheless penetrates through this barrier layer is then bound to the adsorption material and thus prevented from exiting/being emitted from the object according to the invention through the multilayer composite.

The invention further provides a process for producing the multilayer composite or object according to the invention, which comprises a step for forming the at least one layer comprising adsorption material on the at least one further layer by means of (co)extrusion, (co)injection molding, (co)extrusion blow molding or lamination, in particular by coextrusion blow molding.

Processes of this type for producing multilayer composites and moldings are known to those skilled in the art. The production process according to the invention can also comprise further process steps such as steps for chemical and/or physical modification of the composite or object, for shaping or for modifying the shape and/or finish of the composite or the object, for example steps comprising thermoforming and/or vacuum forming, compression molding, welding, attachment and incorporation of further parts, surface coating, printing, labeling, without being restricted thereto.

The invention further provides for the use of the multilayer composite of the invention or object according to the invention for reducing the emission of volatile organic compounds, in particular from fuels for automobiles, and also the use of the abovementioned porous materials for reducing the emission of volatile organic compounds from fuels in plastic fuel tanks for automobiles.

Determination of the Specific Surface Area

As indicated above, the specific surface area is a measure of the internal surface area resulting from the porous structure of the adsorption material. In the case of macroporous (pore diameter >50 nm) and mesoporous (pore diameter 2-50 nm) solids, the specific surface area is determined from the volumetrically static measurement of the nitrogen adsorption isotherms at 77.3 K by multipoint evaluation according to the BET method in a relative pressure range $p/p_0$ of from 0.001 to 0.3 in accordance with ISO 9277:2010. This method is based on determination of the amount of the adsorbate or the adsorptive consumed in order to cover the external surface area and the accessible internal surface area of a solid with a complete monolayer of the adsorbate.

Microporous structures as are present, for example, in molecular sieves, zeolites and activated carbons have voids having geometric dimensions in the order of magnitude of atom diameters or effective molecular sizes. However, in the case of pore diameters in the micropore range, condensation in the pores is frequently observed in the pressure range in which mono-multilayer adsorption takes place on the pore walls, as a result of which a simple BET adsorption measurement would give falsely high values. In order to nevertheless be able also to measure the internal surface area of the micropores present in the adsorption materials which are preferred according to the invention in these measurements, the reference method (January 2011 version) described under the title "Präzisionsbestimmung der spezifischen Oberfläche von Feststoffen durch Gasadsorption" by the German Federal Institute for Materials Testing (BAM) is employed, taking into account appendix C of ISO 9277:2010:

For the volumetrically static measurement of the adsorption isotherms, the sample which has been previously dried and degassed by baking under reduced pressure is supplied stepwise with gaseous adsorptive in the sample container maintained at constant temperature. The specific amount of gas $n_a$ [in mol/g] adsorbed on the sample in equilibrium under the gas pressure of the adsorptive is determined from the respective difference between the admission pressure and the equilibrium pressure in each admission step and plotted against the relative pressure $p/p_0$.

The evaluation is carried out as multipoint variant in a suitable relative pressure range (BET range) by means of the linearized 2-parameter BET equation (I):

$$Y_{BET} = \frac{p/p_0}{n_a(1-p/p_0)} = \frac{C_{BET}-1}{n_{mono} \cdot C_{BET}} \cdot (p/p_0) + \frac{1}{n_{mono} \cdot C_{BET}} = f(x) = i + kx \quad (I)$$

A linear regression method is used to determine the ordinate intercept i and the gradient k, from which the monolayer capacity $n_{mono}$ [in mmol/g] can be calculated according to $n_{mono}=1/(i+k)$. The specific surface area is derived therefrom by taking into account the space requirement G for an adsorptive molecule in the monolayer according to $a_{BET}=n_{mono} \cdot \sigma \cdot N_A$, where $N_A$ is Avogadro's number. Pursuant to the IUPAC recommendations of 1984 and ISO 9277:2010, a value of 0.162 nm² is used for the molecular space requirement σ of nitrogen.

For the evaluation according to the BET multipoint variant for microporous materials, a relative pressure range $p/p_0$ is used in which $n_a \cdot (1-p/p_0)$ increases monotonically with increasing $p/p_0$. The upper limit to the relative pressure range used for the evaluation is given by the maximum of the function $n_a \cdot (1-p/p_0)$ via $(1-p/p_0)$. In this relative pressure range, the fitted BET line also has to have a positive ordinate intercept in order to give a positive value for the BET parameter $C_{BET}$ and the relative pressure value corresponding to the calculated specific monolayer capacity has to be within the relative pressure limits determined according to the above criteria.

The relative pressure range $p/p_0$ which can be used for the evaluation is usually in the range from 0.001 to 0.1.

EXAMPLES

Example 1: Production of Test Plates with and without Adsorption Material

A molecular sieve having a pore size of 4 Å [0.4 nm], for example BASF Molekularsieb 4A (BASF, Ludwigshafen, Germany), and a metal organic framework based on aluminum fumarate, known under the trade name Basolite A520 (BASF, Ludwigshafen, Germany), were used as adsorption materials. The synthesis of such metal organic frameworks is described, for example, in WO 2012/042410 A1.

Spherical adsorption material was manually comminuted in a laboratory mortar. The ground material was passed through an analytical sieve having a metal wire mesh in accordance with DIN ISO 3310-1:2001 and a mesh opening of 500 μm. The sieve fraction was used for the subsequent compounding with polymer. Pulverulent adsorption materials were used directly as obtained, without prior manual comminution, in the compounding with polymer.

Mixtures containing 10% by weight of the respective adsorption material and 90% by weight of HPDE (Lupolen 4261 AG from LyondellBasell Industries, Rotterdam, the Netherlands) were homogenized on a Brabender® Plasti-Corder® W 50 EHT with Lab-Station drive and PC-controlled measuring unit (Brabender® GmbH & Co. KG, Duisburg, Germany) having contrarotating kneading blades at 190° C. and 60 rpm for 5 minutes. The plastic melt obtained was pressed by means of a Schwabenthan specimen press Polystat 200 T (formerly Berlin, Germany) at 190° C. under a pressure of 90 bar for 5 minutes to give plates having the dimensions 200 mm×100 mm×1.6 mm. The plates were subsequently cooled to a temperature below 60° C. by means of the water cooling of the specimen press and demolded.

As blank or comparative specimens, plates composed of 100% by weight of HPDE without adsorption material were produced by the above-described process.

Example 2: Lamination of the Test Plates with 5-Layer COEX Material

A film produced by the coextrusion process and having the layer structure HDPE/bonding agent/EVOH/bonding agent/HDPE and a total thickness of 220 μm, in which the thickness of the two HDPE layers (Lupolen 4261AG) was in each case 90 μm, the thickness of the two bonding agent layers (Admer GT6, Mitsui Chemicals, Tokyo, Japan) was in each case 10 μm and the thickness of the EVOH layer (EVAL F101A, Kuraray, Chiyoda, Japan) was 20 μm, was used as 5-layer COEX material.

This 5-layer film was laminated with the test plates described in example 1 in a Schwabenthan specimen press by in each case applying one of the test plates described in example 1 to one side of the film and pressing this structure at 190° C. under a pressure of 90 bar for 5 minutes, subsequently cooling the resulting laminate to a temperature below 60° C. by means of the water cooling of the specimen press and demolding the laminate.

This example shows that layers comprising adsorption material as per the present invention can also be joined to multilayer coextruded materials using conventional lamination processes.

Example 3: Adsorption and Desorption Measurements

Test plates having a weight of about 20 g and composed of pure HPDE (i.e. without laminated 5-layer film) without addition of adsorption agent (referred to as HPDE in table 1) as comparative specimen and also with addition of in each case 10% by weight of the molecular sieve specified in example 1 (referred to as MS in table 1) or metal organic framework (referred to as MOF in table 1) as adsorption agent were produced as described in example 1. These were exposed to a gaseous ethanol atmosphere at room temperature (about 20-23° C.) in glass containers. Absolute ethanol (denatured with 1% of methyl ethyl ketone), high purity, commercially available from, for example, VWR International GmbH (Darmstadt, Germany) under the catalog number APPCA5007.2500, was used as alcohol. The weight increase was determined over a period of 147 days by means of a Sartorius 2007 MP6 analytical balance (Sartorius, Göttingen, Germany).

The percentage weight change of the test plates over time, in each case relative to the point in time t=0, and also the percentage ethanol loading resulting therefrom, based on the weight of the adsorption agent in the test plates, are shown in table 1. The indicated ethanol loading takes into account the weight loss of the HDPE component in the test plates by extraction of particular constituents from the polymer over time.

TABLE 1

| Time | Weight increase of the test plate [%] | | | Ethanol loading of the adsorbent [%] | |
|---|---|---|---|---|---|
| [Days] | HDPE[1] | MS[2] | MOF[3] | MS[2] | MOF[3] |
| 0 | 0 | 0 | 0 | 0 | 0 |
| 2 | −0.03 | 0.11 | 0.37 | 1.38 | 3.96 |
| 15 | 0.07 | 0.44 | 0.62 | 3.79 | 5.61 |
| 28 | 0.23 | 0.85 | 1.02 | 6.70 | 8.25 |
| 50 | 0.21 | 1.01 | 1.09 | 8.40 | 9.01 |
| 64 | 0.30 | 1.11 | 1.25 | 8.74 | 9.92 |
| 91 | 0.17 | 1.34 | 1.46 | 12.07 | 13.05 |
| 114 | 0.38 | 1.67 | 1.61 | 13.70 | 12.84 |
| 147 | 0.21 | 1.83 | 1.69 | 16.59 | 15.13 |

[1]Test plate composed of 100% by weight of HDPE
[2]Test plate composed of 90% by weight of HDPE & 10% by weight of molecular sieve
[3]Test plate composed of 90% by weight of HDPE & 10% by weight of metal organic framework The test plate which contained molecular sieve as adsorption agent and also the test plate composed of pure HDPE were subsequently taken from the ethanol atmosphere and stored for 7 days under ambient pressure in a vacuum drying oven VT 5042 EK (Heraeus) heated to 60° C. in order to examine the desorption properties. The weight decrease of the test plate was determined by means of the Sartorius 2007 MP6 analytical balance after storage at 60° C. for 24 hours and 48 hours and also 7 days.

Here too, the percentage weight change of the test plates over time, in each case relative to the point in time t=0, and also the percentage ethanol loading resulting therefrom, based on the weight of the adsorption agent in the test plates, were determined. The ethanol loading indicated once again takes into account the weight loss of the HDPE component in the test plates by extraction of particular constituents from the polymer over time. The results are shown in table 2.

TABLE 2

| Time | Weight change of the test plate [%] | | Ethanol loading of the adsorbent [%] |
|---|---|---|---|
| [Days] | HDPE[1] | MS[2] | MS[2] |
| 148 (1)[3] | −0.02 | 1.54 | 15.55 |
| 149 (2)[3] | −0.08 | 1.48 | 15.42 |
| 154 (7)[3] | −0.10 | 1.47 | 15.52 |

[1]Test plate composed of 100% by weight of HDPE
[2]Test plate composed of 90% by weight of HDPE & 10% by weight of molecular sieve
[3]Total duration of the experiment from the point in time at which the test plates were first exposed to the ethanol atmosphere. The time for which only the desorption was examined is indicated in parentheses.

These results show that addition of a suitable adsorption agent to a polymeric support material results in volatile organic compounds being able to be adsorbed in this modified support material and thus bound in the long term, sometimes even at comparatively high temperatures of, for example, 60° C.

A commercial 6-layer COEX fuel container having a barrier layer of EVOH having a thickness of 100 μm displays an emission loss of about 5 mg per day in a CARB 24 hr diurnal cycle when using LEVIII fuel.

If such a fuel container is modified by adding 400 g of adsorption agent to the HDPE layer(s) located behind the EVOH barrier layer, viewed from the fuel side, corresponding to a modification of 50% by weight of the HDPE used in this fuel tank with 10% of adsorption medium, the emission of volatile organic compounds passing through the barrier layer can be prevented or reduced over many years by adsorption of these volatile organic compounds.

Even if only a value of 8% of adsorbed ethanol, based on the mass of the adsorption material, were to be assumed as maximum value of the possible loading of the adsorption agent and virtually the entire emission loss of the fuel tank were to be attributed to the emission of ethanol, for example when using fuels having high ethanol contents, e.g. E85 or E100, such a fuel tank is able to bind 32 g of ethanol. On the basis of the abovementioned emission loss of the fuel tank of 5 mg per day, the time taken to reach this maximum loading of the adsorption agent with ethanol is 6400 days. The modified fuel tank is therefore able to adsorb the ethanol passing through the EVOH barrier layer and thus prevent the liberation thereof into the surroundings for a period of more than 17.5 years.

Furthermore, the use of mixtures of different adsorption agents enables the adsorption behavior of the fuel tank to be matched to the emission profiles of different fuels.

The invention claimed is:

1. A multilayer composite having barrier properties for volatile organic compounds which have a vapor pressure of at least 0.01 kPa at 20° C. (293.15 K),
   wherein the multilayer composite has a first surface and a second surface and comprises at least one first layer and at least one further layer, wherein one of the two layers comprises at least one adsorption material for said volatile organic compounds and at least one polymeric support material in admixture with or bonded to the adsorption material, wherein if the at least one adsorption material and the at least one polymeric support material are bonded to one another, the composite comprises at least three layers, wherein
   the polymeric support material comprises a high density polyethylene (HDPE), and wherein
   the at least one adsorption material is selected from the group consisting of sheet and framework silicates, porous carbon material, metal organic frameworks (MOP) and mixtures thereof.

2. The composite as claimed in claim 1, wherein the content of adsorption material in the layer comprising adsorption material, if adsorption material and support material are present in admixture in one layer, or in the bonded assembly of the layer comprising adsorption material and the layer comprising support material is from 0.001 to 80% by weight, in each case based on the total weight of adsorption material and polymeric support material.

3. The composite as claimed in claim 1, wherein the specific surface area of the at least one adsorption material is at least 10 m²/g.

4. The composite as claimed in claim 1, wherein the adsorption material has pores having a diameter in the range from 0.1 to 10 nm.

5. The composite as claimed in claim 1, wherein the adsorption material has a porosity of at least 5%.

6. The composite as claimed in claim 1, wherein the at least one further layer comprises at least one polymeric material.

7. The composite as claimed in claim 1, wherein the at least one further layer comprises at least one polymeric material which has barrier properties in respect of volatile organic compounds.

8. The composite of claim 1, wherein said silicates comprise porous silicates.

9. The composite of claim 1, wherein said porous carbon material comprises activated carbon.

10. The composite of claim 1, wherein said metal organic frameworks comprise porous metal organic frameworks.

11. The composite of claim 1, wherein said framework silicates comprise zeolites.

12. The composite of claim 1, wherein said porous carbon material comprises covalent organic frameworks (COF).

13. An object for the accommodation, passage or envelopment of substances comprising volatile organic compounds, comprising the multilayer composite as claimed in claim 1.

14. The object as claimed in claim 13, wherein it is a film, a pipe, a hollow body or a closure or other component for such a hollow body.

15. The object as claimed in claim 13, wherein the at least one further layer of the composite comprises at least one polymeric material which has barrier properties in respect of volatile organic compounds where the layer which comprises this polymeric material having barrier properties is located closer to the surface of the object which is provided for contact with the substance comprising the volatile organic compound than the layer comprising adsorption material.

16. A process for producing a multilayer composite or an object as claimed in claim 1, which comprises a step for forming the at least one layer comprising adsorption material on the at least one further layer by means of (co)extrusion, injection molding, (co)extrusion blow molding or lamination.

17. The use of a multilayer composite or an object as claimed claim 1 for reducing the emission of volatile organic compounds.

18. A composite as claimed in claim 1, wherein the volatile organic compounds are selected from the group consisting of acyclic and cyclic aliphatic and aromatic, optionally branched and/or halogenated hydrocarbons and heteroaromatic compounds, alcohols, acetals, ketones, ethers, carboxylic acids and mixtures thereof.

* * * * *